US008195613B2

(12) United States Patent
Vukojevic

(10) Patent No.: US 8,195,613 B2
(45) Date of Patent: Jun. 5, 2012

(54) TRANSACTIONAL ARCHIVING OF AN ELECTRONIC DOCUMENT

(75) Inventor: Bojan Vukojevic, Dublin, CA (US)

(73) Assignee: Autonomy Corporation Ltd., Cambridge (GB)

( * ) Notice: Subject to any disclaimer, the term of this patent is extended or adjusted under 35 U.S.C. 154(b) by 329 days.

(21) Appl. No.: 12/536,823

(22) Filed: Aug. 6, 2009

(65) Prior Publication Data

US 2011/0035356 A1    Feb. 10, 2011

(51) Int. Cl.
*G06F 17/00* (2006.01)
(52) U.S. Cl. ........................................ 707/648; 707/703
(58) Field of Classification Search .................. 707/648, 707/703
See application file for complete search history.

(56) References Cited

U.S. PATENT DOCUMENTS

| 6,192,365 | B1 * | 2/2001 | Draper et al. ................. 707/648 |
| 6,965,904 | B2 | 11/2005 | Bankert et al. |
| 7,272,594 | B1 | 9/2007 | Lynch et al. |
| 7,900,085 | B2 * | 3/2011 | Little .............................. 714/10 |
| 2005/0278274 | A1 * | 12/2005 | Kovachka-Dimitrova et al. .................................. 707/1 |
| 2006/0080316 | A1 * | 4/2006 | Gilmore et al. ................... 707/9 |
| 2006/0259468 | A1 * | 11/2006 | Brooks et al. ..................... 707/3 |
| 2008/0077423 | A1 | 3/2008 | Gilmore |
| 2008/0250074 | A1 * | 10/2008 | Parkinson ..................... 707/200 |

OTHER PUBLICATIONS

United Kingdom Intellectual Property Office, Search Report for UK Patent Application GB 1010369.5, dated Oct. 4, 2010, 3 pages.

* cited by examiner

*Primary Examiner* — Shahid Alam
*Assistant Examiner* — Muluemebet Gurmu
(74) *Attorney, Agent, or Firm* — Rutan and Tucker, LLP

(57) ABSTRACT

Various methods and apparatus are described for archiving of an electronic document between multiple interconnected archive units of a distributed server network in geographically-dispersed locations in order to store identical copies of the electronic document at the same time. An archival portal server in the distributed server network sends a five-step, two-phase commit protocol to a selected set of two or more transaction manager instances resident on remote archive units. The archival system reconciles if an error occurs between a start of a transmission of the electronic document and a permanent archiving of that electronic document, or the electronic document is stored in a permanent data storage location within each of the archive units at an end of the two-phase commit protocol making archiving of an electronic document to multiple locations an atomic operation.

20 Claims, 6 Drawing Sheets

Abandoned Transaction Resolution Matrix

| SmartCell 1 | SmartCell 2 | Resolution |
|---|---|---|
| ACTIVE | Any State | Rolled back |
| Any State | ACTIVE | Rolled back |
| PREPARED | PREPARED | Committed |
| PREPARED | Null | Committed |
| Null | PREPARED | Committed |
| ROLLBACK_ONLY | Any State | Rolled back |
| Any State | ROLLBACK_ONLY | Rolled back |

TRANSACTIONAL ARCHIVING OF AN ELECTRONIC DOCUMENT

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to archiving of an electronic document. More particularly, an aspect of an embodiment of the invention relates archiving of an electronic document in archival units in different locations.

BACKGROUND OF THE INVENTION

Archiving of the electronic documents has long been known and is widely used in the industry today. The challenge is to provide reliable archiving to disperse geographical locations in order to save the data and allow uninterrupted access even if one location is not accessible. Data archived to multiple locations must be a mirror copy of the original data. There are known technologies to provide data mirroring, but most are extremely expensive and rely on the copy of the data from one location to the next. This document describes a different approach and introduces a concept of reliable transactional electronic document archiving to a distributed server network that is not mirrored, therefore simplifying infrastructure and greatly reducing the cost of archiving, while maintaining the fidelity of the data.

SUMMARY OF THE INVENTION

Various methods and apparatus are described for transaction archiving an electronic document in two or more locations at the same time. In general, a set of transaction manager applications cooperating on archival units in different locations may perform a two-phase commit protocol to archive electronic documents. The electronic document may be archived between multiple interconnected archive units of a distributed server network in geographically-dispersed locations in order to store identical copies of the electronic document at the same time in two or more of the archive units. The transaction manager application causes archiving portal in the distributed server network to send a five-step, two-phase commit protocol to a selected set of transaction manager instances resident on the remote archive units (smart cells). The transaction manager application monitors a persistent state of the archiving of the electronic document. A transaction manager application assigns a unique ID to each electronic document and to each transaction in the temporary memory data storage location based on receiving a begin method of the two-phase commit protocol from a transaction manager resident on the archiving portal. The transaction manager application on archiving portal sends the same document in parallel to the transaction manager instances on the archival units (smart cells). Transaction managers running on the remote archive units validates that the document is uncompromised and completes and stores the electronic document in a temporary location. The transaction manager application reconciles the archival system if an error occurs between a start of a transmission of the electronic document and a permanent archiving of that electronic document. In a final step, the transaction manager application then stores the electronic document in a permanent data storage location in each of the smart cells at an end of the two-phase commit protocol. This approach ensures atomic transactions and auto-recovery in case of a failure.

BRIEF DESCRIPTION OF THE DRAWINGS

The drawings refer to embodiments of the invention in which:

FIG. 6 illustrates a table for an embodiment of the transaction manager and its abandoned transaction resolution matrix.

Figure 1:
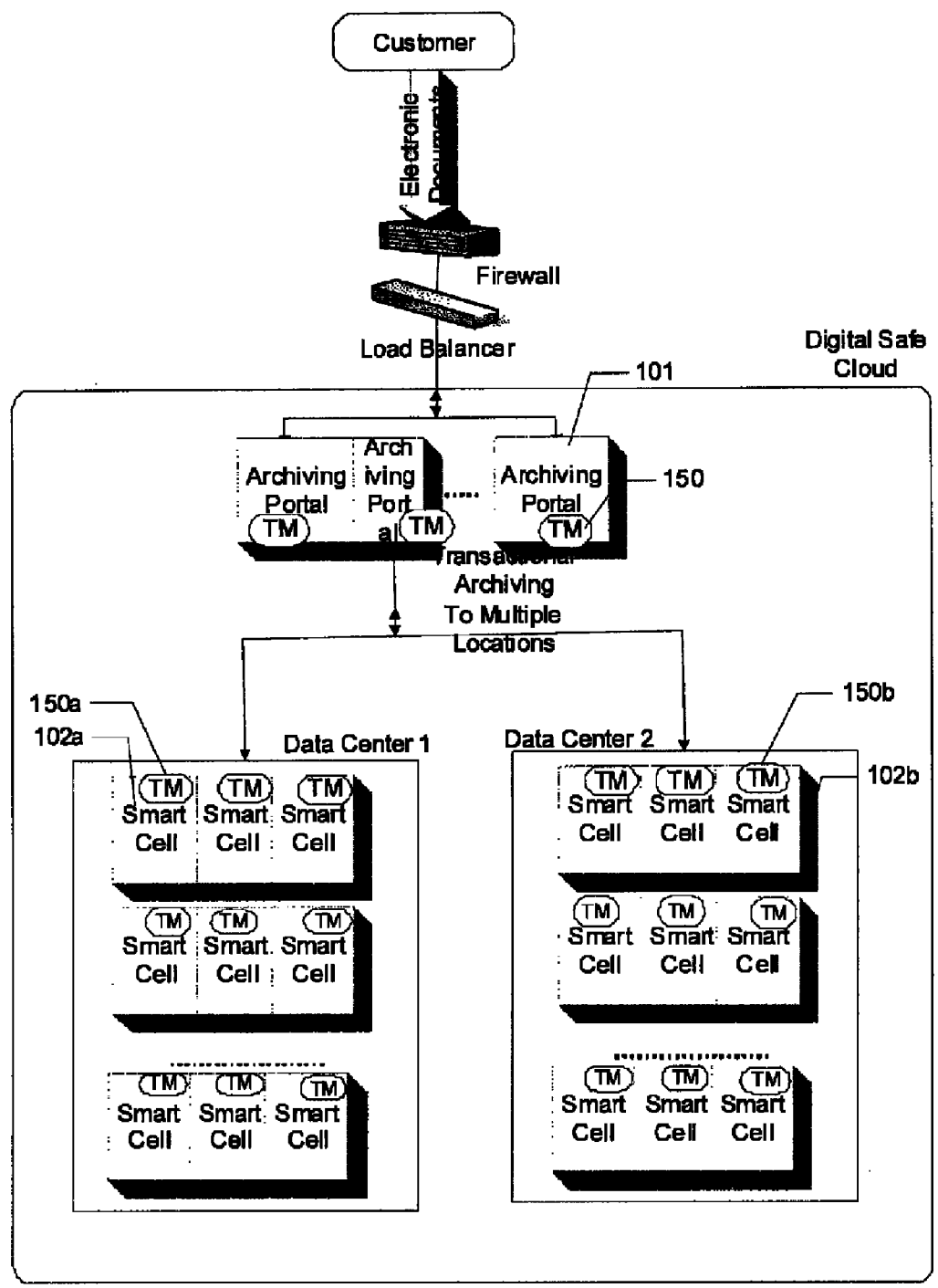
FIG. 1 illustrates a block diagram of the cloud that shows data flow through archiving portals and archiving of the electronic documents in a multiple interconnected archive units, each implementing an instance of the server transaction manager application.

While the invention is subject to various modifications and alternative forms, specific embodiments thereof have been shown by way of example in the drawings and herein will be described in detail. It should be understood the invention should not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, types of servers, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first server, may be made. However, the specific numeric reference should not be interpreted as a literal sequential order but rather interpreted that the first server is different than a second server. Further steps performed in one embodiment may be also combined with other embodiments. Thus, the specific details set forth are merely exemplary. The specific details may be varied from and still be contemplated to be within the spirit and scope of the present invention.

In general, a set of transaction manager applications cooperating on archiving portals and archival units in different locations may perform a two-phase commit protocol to archive electronic documents. The electronic document may be archived between multiple interconnected archive units of a distributed server network in geographically-dispersed locations in order to store identical copies of the electronic document at the same time. The transaction manager application causes an archiving portal in the distributed server network to send a five-step, two-phase commit protocol to a selected set of transaction manager instances resident on remote archive units (smart cells). The transaction manager application monitors a persistent state of the archiving of the electronic document. The archiving transaction of the electronic document is initiated with a begin method invocation on the archiving portal. Implementation of the begin method creates new, globally unique document ID and transaction ID. Once the archiving portal has successfully allocated a document ID and transaction ID the transaction manager resident on the archiving portal will invoke a method to archive electronic documents and associated meta-data on the set of remote archival units. Implementation of the archive method on the archiving portal will invoke the remote archive method on all of the selected archival units in parallel. The transaction manager resident on the archiving portal uses a custom remote method invocation protocol that allows invocation of the remote command while attaching the data from the electronic document. The transaction manager application stores the electronic document in a temporary data storage location in each of the selected archive units (smart cells) during the two-phase commit protocol. The transaction manager application reconciles the archival system if an error occurs between a start of a transmission of the electronic document and a permanent archiving of that electronic document. The transaction manager application then stores the electronic document in a permanent storage location at an end of the two-phase commit protocol. The archival system allows uninterrupted access from a client machine to at least one of the copies of the archived electronic document in the archive units of the distributed server network even if one archive unit location is not accessible. The transactional archiving of the electronic document conveys archiving of the same data at the same time in two or more eventual permanent storage locations that are located in geographically different locations. Transactional archiving of the electronic document differs from data replication, which may only be generating a single copy of the data to be stored in a back up permanent storage location. The permanent storage location may be a file system including a data storage device where the data 1) remains stored even if the power is lost (similar to non-volatile systems) and 2) the data cannot be over written (similar to one time programmable and FLASH memories)

FIG. 1 illustrates a block diagram of multiple interconnected archives, each implementing an instance of the server transaction manager application. An archive portal server 101 may receive a new electronic document from a customer's server. The transaction manager 150 on the archive portal server 101 may transactionally archive the incoming electronic document on two separate archive units 102a and 102b at the same time. Each document is sent to a pair of archival units 102a and 102b called smart cells running instances of transaction managers 150a and 150b. In an embodiment. the electronic document is always archived to both cells 102a and 102b in a pair or to none at all. In other embodiments, the electronic document is permanently archived to two or more smart cells or none at all. Once document is archived, the document can be independently retrieved from either cell 102a and 102b.

The transaction manager application, such as transaction manager 150, resident on the archiving portal 101 initiates the archiving transaction. Each server transaction manager application 150a and 150b is configured for transactional archiving of an electronic document between the multiple interconnected archive units 102a, 102b of the distributed server network in geographically-dispersed locations in order to store identical copies of the electronic document at the same time, monitor the persistent state of the archiving of the electronic document, and reconcile the archival system if an error occurs between a start of a transmission of the electronic document and a permanent archiving of that electronic document. The archive units 102a, 102b of the distributed server network allow uninterrupted access from a client machine to at least one of the copies of the archived electronic document even if one archive unit location is not accessible. The transaction manager application 150 resident on the archiving portal 101 is coded to broadcast a five-step, two-phase commit protocol to a selected set of the other transaction manager instances resident on remote archive units, such as a first archive unit 102a and a second archive unit 102b. The server transaction manager application is also coded to reconcile the multiple interconnected archive units 102a and 102b if an error occurs between the start of the transmission of the electronic document and the permanent archiving of that electronic document in any of the multiple interconnected archive units 102a and 102b.

Thus, an instance of the transaction manager resident on the archival server 102a is coded to monitor and resolve archival transaction state and to restore consistency to geographically dispersed archival units in the event an error occurs during the archiving transaction. In the case when the server or the process implementing transaction manager 102a dies in the middle of the transaction, the transaction state always provides enough information for the transaction manager to resolve the transaction that was still in progress once server and/or transaction manager process has been restarted. See FIG. 6 for an example table maintained by a transaction manager and its abandoned transaction resolution matrix. Referring to FIG. 1, once transaction manager 102a starts it will poll for abandoned transactions. Transactions are considered abandoned if the transaction state is not changing for a very long time. Exact amount of time required to mark transaction as abandoned is a configuration parameter of the transaction manager. Status of the abandoned transactions is resolved by getting the state of the transaction from all archiving units that participated in transaction. Transaction can be in one of the following states: INITIATED, ACTIVE, PREPARED, ROLLBACK_ONLY. When the transaction begins, transaction has the state INITIATED. Invocation of the archive method on the archiving units 102a and 102b will move the transaction status to ACTIVE state if invocation was successful or ROLLBACK_ONLY if invocation fails. Invocation of the prepare method on the archival units 102a and 102b will change the state of the transaction to PREPARED state if invocation was successful or to ROLLBACK_ONLY if invocation fails. Transaction can be committed only if it is in a state PREPARED. If the transaction is in the state ROLLBACK_ONLY, it can only be rolled back. The table in FIG. 6 shows an example matrix used to determine if the abandoned transaction should be committed or roll backed.

Each archiving portal and archival unit communicates with the other remote archival units via the network protocol connection, such as a TCP/IP network connection 112, at a data link layer and executes one stream between the two instances of the transaction managers during the archiving of the copies of the electronic document. The stream includes commands and attached attachments, which include a metadata attachment and the data of the electronic document as the other attachment.

A leader, the transaction manager 150 on the archiving portal server 101, exists for each transaction to coordinate the two-phase commit protocol for this process and is commonly referred to as transaction coordinator. This transaction manager selects a set of transaction managers on the archiving units to receive the electronic document. Transaction managers in this set are called transaction participants. The relevant transaction managers communicate among themselves to execute the two-phase commit protocol schema below, and archive electronic document.

The transaction managers ensure reduced archiving cost at unparalleled data fidelity by use of the two-phase commit protocol with no impact on archiving performance. The transaction managers ensure that the archiving system is always consistent and that an exact copy of an electronic document is permanently archived at two or more archival units in geographically-dispersed locations in the multiple interconnected archive units. The transaction manager is coded to leave the archival system in consistent state by always knowing the state of the archival transaction of the electronic document. The transaction manager implements 1) a commit method of the two-phase commit protocol to write the electronic document in permanent storage at the end of the archival transaction process and 2) a rollback method to rollback the archive units and remove electronic document from the temporary location, and communicate that an error occurred in the archival transaction process to the transaction manager instance initiating the two-phase commit protocol in order to restore consistency among the geographically dispersed archival units.

The transaction managers give the ability to have the identical instances of electronic document data copies in geographically-distributed locations at no additional hardware cost, while still always leaving the archiving of the electronic document across each of the archival units in consistent state.

The transaction managers give the ability to have data copies in multiple geographically-distributed locations atomically. An atomic commit may be an operation in which a set of distinct changes is applied as a single operation. The electronic document with its associated metadata archived in the multiple locations must be an exact mirror copy of the original data. This way, the transaction manager gives the ability to preserve the data and allow seamless access to data even in the event that not only one disk, or one node fails, but when the whole data-center is destroyed. The transactional archiving with the transaction manager provides at least four times better protection for customer data than simply implementing a RAID system on NAS (RAID 6) because the multiple archival servers are in geographically-dispersed locations and the transaction manager works in the background to ensure that the archiving of the electronic document across each of the archival units is an atomic operation.

The transaction manager gives the ability to have reliable transactional electronic document archiving in a distributed server network that is not mirrored, therefore simplifying infrastructure and greatly reducing the cost of archiving, while maintaining the fidelity of the data. The transaction manager works in the background between the archiving sites to maintain the consistency of the stored and replicated documents.

The archive units 102a and 102b may employ a split-cell architecture for permanent storage of the electronic documents. The split-cell architecture for permanent storage is a grid based paradigm that is infinitely scalable, maintaining performance under any load. The two or more fully synchronized archive units, geographically separated, provide complete data and system redundancy and parallel processing of all tasks. The design is uniquely qualified to support the performance and volume requirements that are necessary for processing the rapidly expanding number of electronic documents including all forms of textual, audio and video mail and attachments.

Figure 3:
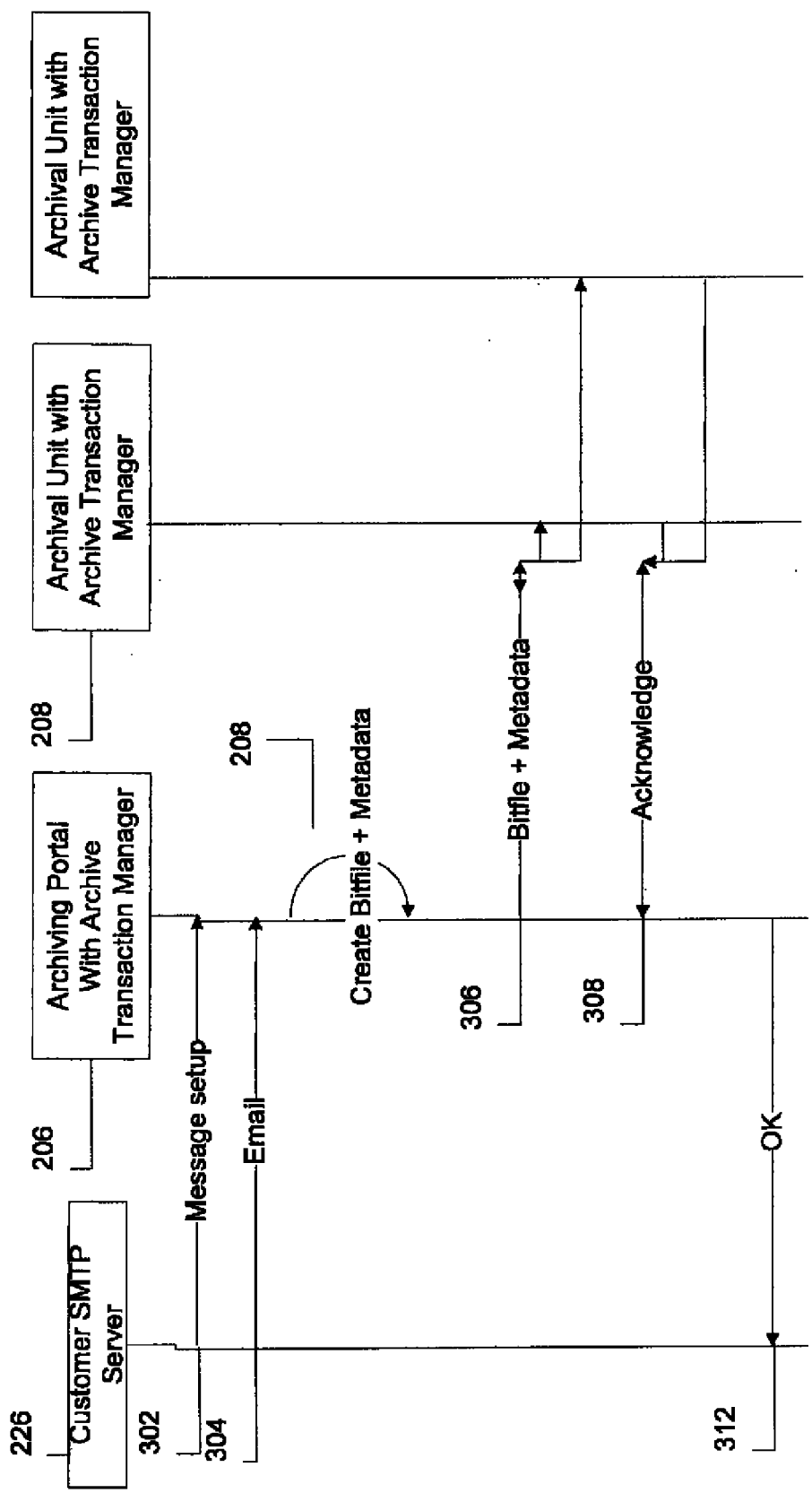
FIG. 3 is a flow diagram depicting an example electronic document storage operation integrated with the two-phase commit protocol.

FIG. 3 is a flow diagram depicting an example electronic document storage operation integrated with the two-phase commit protocol. The process begins with a message setup exchange 302 between customer client machine, such as a customer SMTP server and the local archiving portal server. Next, the electronic document to be archived is transferred from the customer SMTP server to the archiving portal server as an email 304.

The archive server parses the electronic document to extract metadata for the electronic document. A structure called "bitfile" is created for the electronic document itself. The bitfile represents compressed electronic document, and a signature used to verify the authenticity of the electronic document. Another file containing the associated meta data is also created at 208.

The transaction manager on the archiving portal server sends the electronic document bitfile and metadata file as attachments to the archive method to two or more archive units at the same time for permanent storage at 306. The transaction manager resident on this archival portal server sends this command 306 to other instances of transaction managers' resident on remote hosts via the two-phase commit protocol. The two-phase commit sequence is described in more detail in FIG. 4 below.

When this archiving process via the two-phase commit is complete, the transaction managers on the archive units send an acknowledge message to the archive SMTP server at 308. In turn, the archive SMTP server sends an OK message to the customer SMTP server at 312.

The transaction manager resident on the archiving portal using the two-phase commit method gives the ability to attach an arbitrary amount of data to the invocation of the two-phase commit method on the remote archival host with no/minimal memory overhead (Command Attachments) by streaming the data in frames through the same socket connection during the archiving process. The transfer of the electronic document between the archival server units is not, per se, being stored in a temporary memory buffer in its entirety before the remote host starts acting on the received data rather the bytes representing electronic document are streamed between the units from a transaction manager on the archiving portal to the other transaction managers on remote archival servers as a command with attachments. The command with attachments is streamed as sequence of data elements (frames). The server transaction manager application listening at the non-blocking socket of the server asks the object in the streaming session, do you have an attachment? If so, forward all data following the object to its attachment as long as the frames in which data is coming over the socket are full. When the streaming process encounters a frame partially full or a zero length frame, it initiates a method on the attached object that indicates end of the attachment. The electronic document attachment is broken into frames to carry that data. The command typically has two attachments but could indicate how many attachments in its header to the server application. The non-blocking socket of the server is always kept open as well as the client socket on the archiving portal. Thus, the non-blocking server socket receives all of the frames full of data and the server transaction manager application listening at the non-blocking socket of the server notes when an end frame in that sequence of streamed data is not full. This indicates to the server transaction manager application that the transmission of the attachment is complete. A check sum occurs to verify the integrity of data in the attachment.

Figure 4:
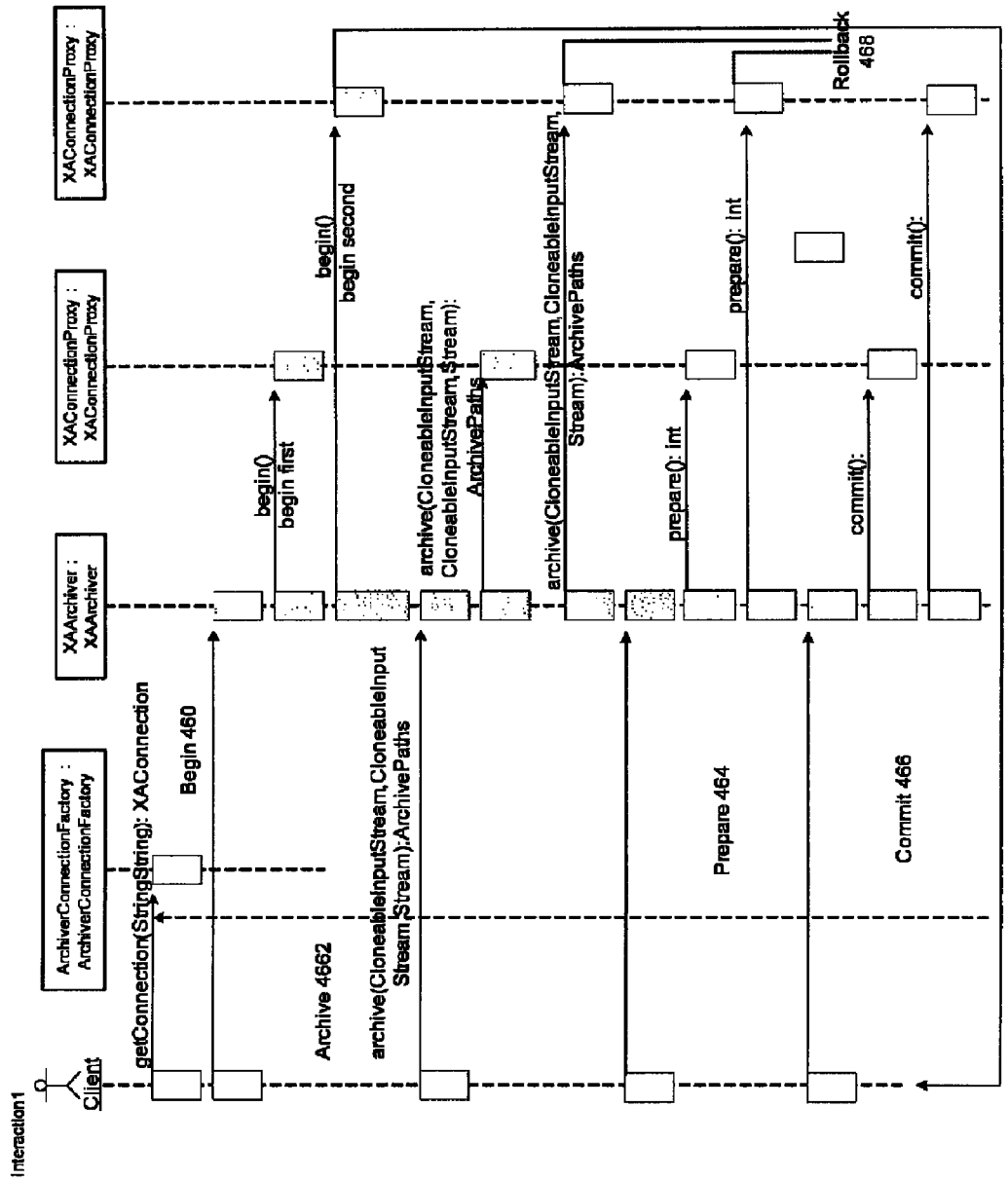
FIG. 4 illustrates a sequence diagram for an embodiment of the two-phase commit protocol.

FIG. 4 illustrates a sequence diagram for an embodiment of the two-phase commit protocol. Each instance of the transactional manager resident on its local archival server is coded to implement the following five-step, two-phase commit protocol for a new received electronic document. The following five methods make up an example two-phase commit protocol consisting of: the Begin method 460, the Archive method 462, the Prepare method 464, the Commit method 466, and the Rollback method 468.

The distributed nature of trying to keep the archival states consistent among the archival site requires an implementation of the remote command execution framework (framework for executing the commands/methods of the two-phase commit protocol in parallel on multiple remote machines/archival units,) as the lowest layer in the application stack with the aim of satisfying performance requirements on a commodity hardware platform. This remote command execution framework is based on the use of non-blocking sockets of the server and allows transfer of objects (commands and commands with attachments) across the network and invocation of the remote command on the remote server. Objects are serialized as they are transferred across the network, but there is no additional overhead, like additional client threads, required to execute a method on the remote host. Since archiving requires transfer of large amounts of data across the network, the new Remote Command Execution framework supports the unique ability to attach the data (electronic document and associated metadata) to an invocation of the method on the remote host (Command Attachments). Data transfer is an atomic operation as far as the remote command execution is concerned. In other words, if the command has an attachment, by executing the two-phase commit protocol built on top of this Remote Command Execution framework, it is not possible to have command invocation on the remote host until the attachment is transferred and is available for the invocation of the method on the remote host. Command attachments in the archive method of the two-phase commit protocol are streamed across the network since streaming allows data transfer with a very low memory footprint. Remote commands with attachments are the bases of the transactional archiving. This is very fast because the non-blocking socket does not close when the transaction is complete, instead the socket is kept open. Thus, the non-blocking socket does not need to cycle thru closing and reopening for the next command or command with attachment. The transaction manager application listening at the non-blocking socket merely recognizes when a transmission of an attachment is complete when the last frame is not full with data or has zero length. Other systems sometime need the non-blocking socket to close to tell when the transaction is complete. One stream is used to communicate both commands and the attached data (i.e. electronic document and associated metadata attachments).

The archiving transaction of the electronic document is implemented using the two-phase commit process modified for the purpose of electronic document archiving. When the transaction is initiated, one additional thread is started to execute remote commands on two different remote hosts in parallel. Every archiving command is automatically split in multiple remote commands inside a framework to satisfy the distributed nature of the system.

Transactional archiving requires each instance of the transaction manager resident on the archival server to implement the following unique five step two-phase commit methods: Begin method 460; Archive method 462; Prepare method 464; Commit method 466; and Rollback method 468.

The transaction manager keeps track of the state of archiving transactions of the electronic documents, understands the current state of the archival process/archiving transaction persistent state so the transaction manager can either commit the archiving of the electronic document to a permanent storage location, or if an error occurs in this archiving process rollback the state of the archiving system to remove the electronic document from temporary storage location, and communicate that an error occurred in the archival process to the local transaction manager instance initiating the two-phase commit protocol in order to restore consistency among the geographically dispersed archival units.

The transactional manager resident on archiving portal is coded to implement the following five-step, two-phase commit protocol for a newly received electronic document and the distributed archival transaction across remote archival units occurs in parallel. The transactional manager resident on its archiving portal receiving the new electronic document cooperates with the other instances of the transactional manager resident on remote archival units to implement the following five methods of the two-phase commit protocol. The two-phase commit protocol starts with a begin method 460 to assign an ID to the archival transaction, then changes are performed, document and metadata are transferred to the remote archival units (smart cells) and the archival transaction is prepared for permanent storage in each of the remote archival units and once all transaction participants confirm that transaction preparation was successful, then the archival transaction of the electronic document is committed in the last method executed in the two-phase commit protocol.

The distributed archival transaction across remote archival hosts occurs in parallel. Transaction starts with "begin", then changes are performed and transaction is prepared. Once all transaction participants confirm that transaction preparation was successful, then the transaction is committed in the last method executed. Once transaction is committed, the archiving of the electronic document cannot be rolled back.

In contrast, archiving transactions that are left in progress after system crash are automatically resolved upon system restart. The transaction manager running on the server is capable of, not only executing remote commands but, transferring files as well and is responsible for resolving archival transactions left in progress after crash or restart.

The 'begin' method 460 of the two-phase commit protocol starts/initiates the archiving transaction and assigns a globally-unique transaction ID to the new archiving transaction.

The 'archive' method 462 is a command that carries attachments, such as two attachments. The first attachment represents a "bitfile" containing a compressed copy of the original electronic document and a signature. The second attachment is a compressed copy of the additional meta-data associated with the electronic document. With the invocation of the "Archive" method 462, the electronic document attachment and its meta-data attachment are placed/written into the temporary directory on the remote hosts, while the remote command initiates an archiving transaction by creating a transaction log entry and validating the integrity, i.e. md5sum, of the transferred attachments. Note, the md5sum may be a computer program that calculates and verifies 128-bit MD5 hashes, as described in RFC 1321. The MD5 hash (or checksum) functions as a compact digital fingerprint of a file. Because almost any change to a file will cause its MD5 hash to also change, the MD5 hash is commonly used to verify the integrity of files (i.e., to verify that a file has not changed as a result of file transfer, disk error, meddling, etc.).

The transactional manager is coded to listen at a non-blocking socket for a command and attachment carried by frames. The frame is an array of bytes that has pre-determined size. The frame not being full of data indicates that the transmission of the attachment to the command is complete. The electronic document attachment can be broken into frames to carry that data. The command typically has two attachments but could indicate how many attachments in its header to the server application. The non-blocking socket is always kept open. The server non-blocking socket receives the frame full of data and notes when an end frame in that sequence of streamed data is not full. This indicates to the server transactional manager application listening at the non-blocking socket that the transmission of the attachment is complete. A check sum can occur to verify the integrity of data in the attachment. One of the arguments of the remote command is the checksum originally calculated on the archival portal that is sending the document. This value is then compared to the newly calculated value on the receiving side on each smart cell to ensure that the document arrived unchanged. Server assumes streaming of attachment is complete by reading when last frame in sequence associated with command is not full of data/complete. The attachment of the electronic document and metadata are stored in temporary location. The transaction status at this point is "active" and the transaction is added to the list of transactions in progress. This Archive method 462 must be successful on all remote hosts/archival units for the transaction to proceed.

In an embodiment, once the archiving transaction is initiated, the client calls the archive method 462 to archive electronic document. The implementation of this archive method 462 will first pick a set of archiving units (smart cell pair) as a target for the archive method. Cell pair is picked using Weighted Round Robin mechanism from the list of registered objects in JNDI. Once cell pair is picked, archive will transfer bitfile and associated metadata to both cells in a cell pair and initiate archive transaction on the server. Implementation of the archive method 462 will pass checksum of the bitfile and metadata as the arguments to the invocation of the remote archive method. Remote method is invoked through custom Remote Method Execution framework and bitfile and metadata are transferred as command attachments. When the archive method 462 is invoked on the server, it will validate the checksum of the received files ensuring that they are unchanged as they are stored in the temporary location. Next, primary cell will allocate permanent location for the transferred bitfile and metadata. All this information will be recorded in the persistent location on the archival units (smart cells). Transaction state at this point is ACTIVE. If for whatever reason checksum calculated on the sending side does not match the checksum calculated on the receiving side, transaction manager on the archival units will raise an exception. This will cause the whole archiving transaction to be rolled back.

Invocation of the archive method 462 is happening in parallel on all selected archival units. This feature allows for best performance since the time is spent in network interaction to two servers in parallel. Method returns when both threads have completed.

Once all archival units have completed archive successfully, implementation of the archive method will return success.

The next call in the sequence is a 'prepare' method 464, which prepares the archiving transaction of the electronic document for the final commit on all remote hosts/archival units. Thus, the prepare method 464 prepares the move/propagation of the electronic document that has passed its check sum along with its metadata from the temporary storage location into a permanent archival storage location. The prepare method 464 assigns the final path for the electronic document and metadata, that were attachments, in the archive as well as changing the transaction status to "prepared". This prepare method 464 must be successful on all remote hosts for the transaction to proceed.

The final method in the archive transaction is the 'commit' method 466. Remote invocation of this commit method 466 moves the electronic document and its metadata on all remote hosts to their permanent location inside the archive, and deletes the transaction from the list of transactions in progress. Once committed, an archival transaction cannot be rolled back.

In an embodiment, when the commit method 466 is invoked on the server, the commit method 466 will cause the bitfile and metadata to be transferred from the temporary location into a permanent location, archive counts will be updated transaction will be removed from list of transactions in progress and document will be queued for indexing.

The fifth method is the rollback method 468. The transaction manager on the archiving portal is responsible for issuing a rollback in case an exception is encountered during archiving process.

The archival transaction of the electronic document can be rolled back with the rollback method 468 at any point prior to execution of the commit method 466. The rollback method 468 removes the streamed electronic document and metadata from the remote host's temporary location and from the list of active transactions.

An advantage of implementing the archiving transactions is the ability to handle errors safely and transparently. If an error occurs at any point during archiving process, then the archiving portal can issue a rollback command 468 that will cause the server to remove the files from the temporary location and delete the transaction from the list of active transactions.

The transaction managers track the persistent state of the archiving transaction. In case the server crashes then the transaction status always provides enough information for the transaction manager to resolve the transaction that was still in progress when server went down. So, XAArchiveRecovery object runs on the archival units. This object is implemented as a singleton. It validates that no transaction is in progress for a very long time. Transaction timeout is configurable with default value of two hours to accommodate for archiving of extremely large files on a stressed network. If XAArchiveRecovery finds a transaction with a status that was not updated for more than two hours, it examines the status of the transaction on all archiving units that participated in the transaction. If any of the transaction participants is not accessible, it will report an error and wait another two hours to check again. If all transaction participants are available, it will get the transaction status from all participants. Based on the transaction status from primary and secondary XAArchiveRecovery object makes a decision if the abandoned transaction should be rolled back or committed. Example of the decision matrix based on an example two transaction participants is shown in FIG. 6.

Each transaction manager is coded to implement the distributed transaction for archiving of the electronic documents built on top of the remote method execution framework that allows data attachments for method executions ensuring atomic data transfers. The set of cooperating transaction managers allow a mirror copy of the electronic document without the need for expensive mirroring technologies.

Figure 5:
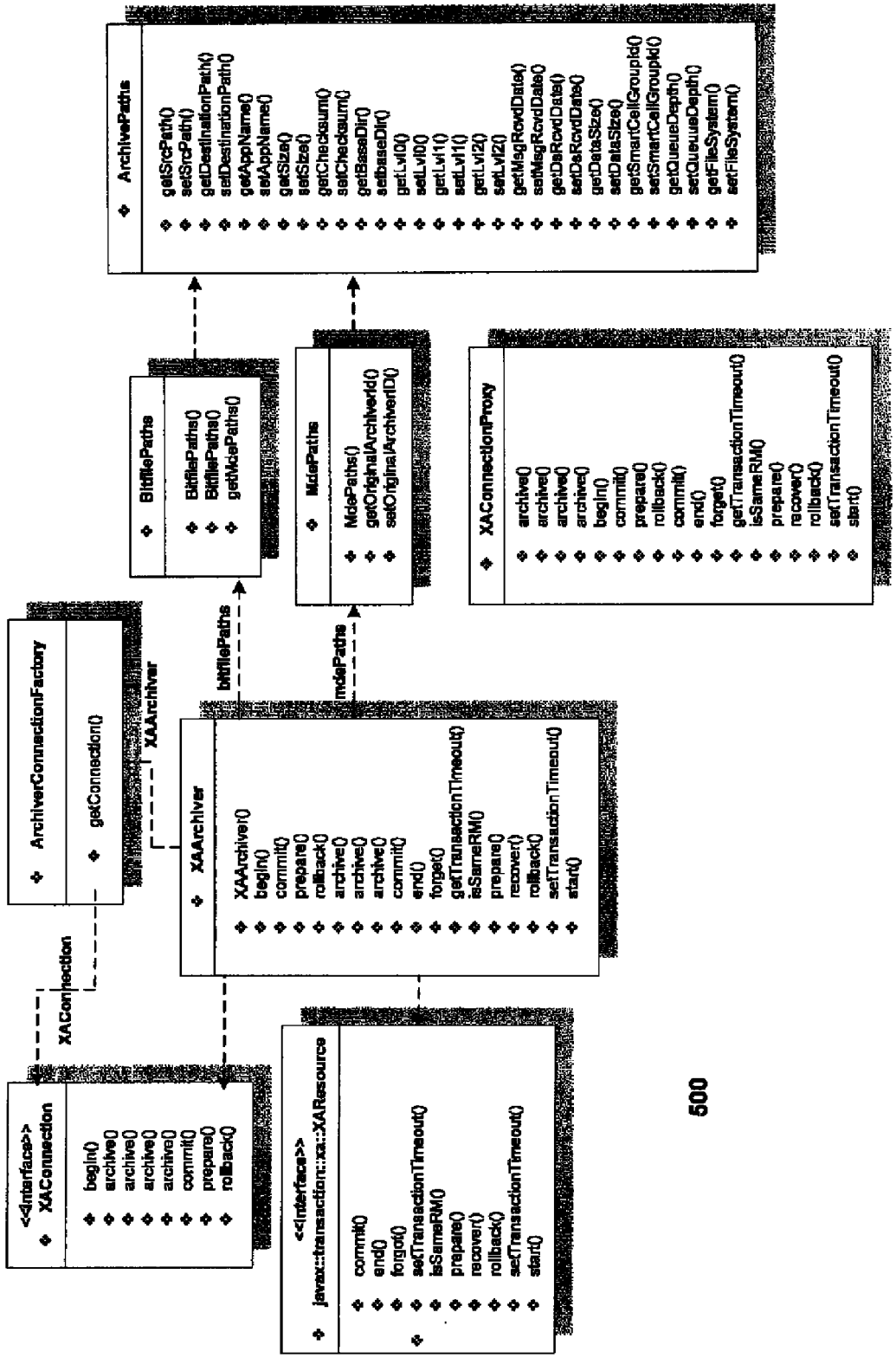
FIG. 5 illustrates a Client class diagram of an embodiment of the transaction manager.

FIG. 5 illustrates a Client class diagram of an embodiment of the transaction manager. The transaction manager implemented in the object called XAArchiver is coded to give the ability to archive documents to multiple geographically distributed locations atomically. The transaction manager 500 is coded to utilize a remote command execution framework based on use of one or more non-blocking sockets of a server. Remote Command Execution framework implements a protocol to attach an arbitrary amount of data to the invocation of the remote method with no/minimal memory overhead (Command Attachments). The set of cooperating transaction managers implement a protocol to process a large number of transactions simultaneously since one transaction need not be complete before another transaction manager launches another electronic document archiving process.

The archival system gives the ability to archive more data than any other competitor archive by use of multiple archival servers in combination with the multi-dimensional permanent grid cell storage technique.

The multi-dimensional permanent split-cell architecture overcomes shortcomings in Storage Area Networks (SANS) and other network storage devices. The customers' data is stored in two geographically-dispersed, ultra-secure, SAS 70-compliant data centers, ensuring extra protection and Continuity of Business in the event of a natural or man-made disaster.

Figure 2:
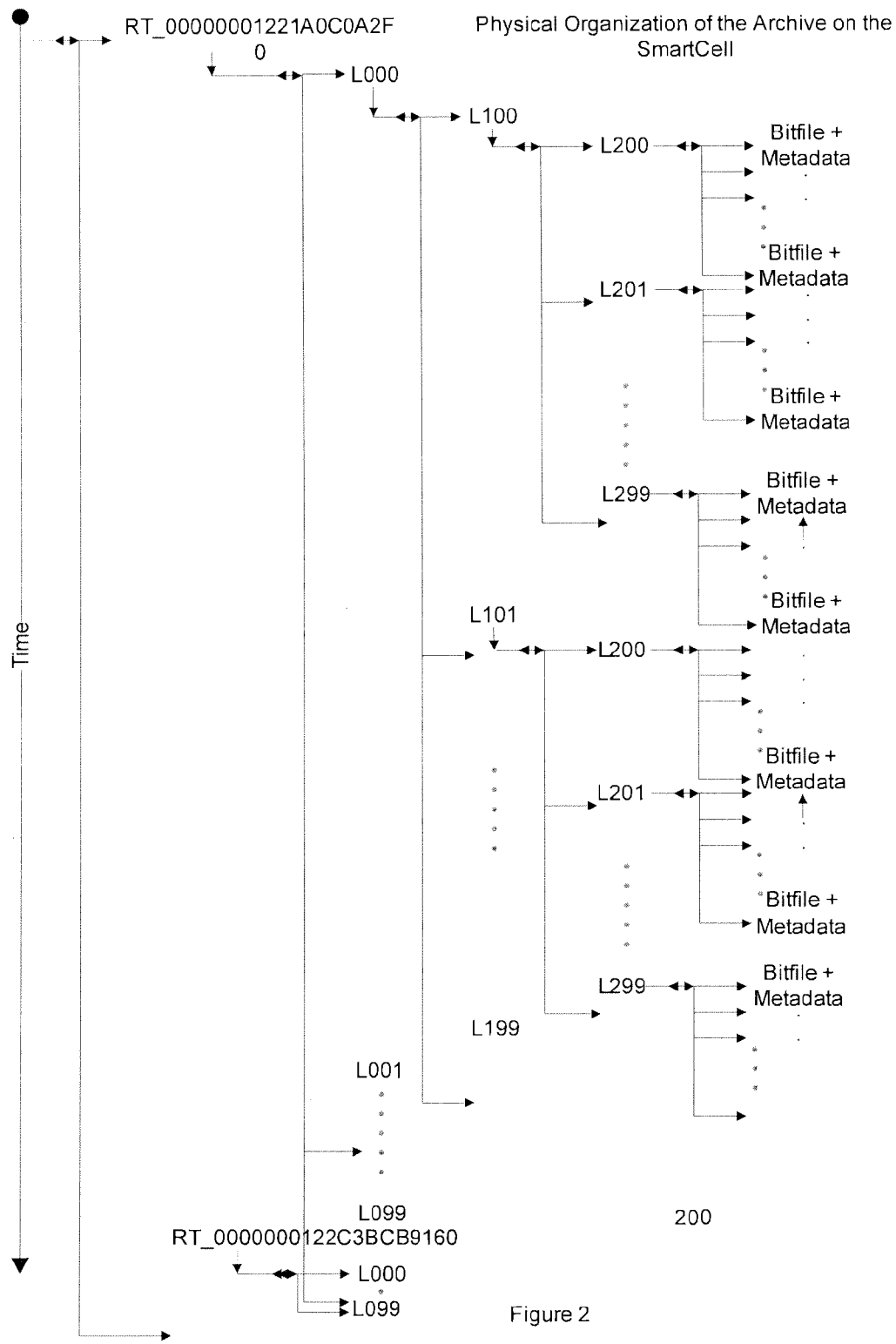
FIG. 2 illustrates a diagram of the physical organization of the archive unit including the permanent storage location.

FIG. 2 illustrates a physical organization of the archive unit including the permanent data storage location. The archive unit is organized as a tree where the top level represents an RT directory. This is a directory created based on the time the electronic document in a form of bitfile and metadata is received in the archive unit. One archive unit has many RT directories. Each RT directory has subdirectories called level zero directories. There can be up to one hundred "level zero" directories under one RT. Each "level zero" directory contains up to one hundred "level one" directories. Each "level one" directory contains up to one hundred "level two" directories. Each "level two" directory contains approximately fifty electronic documents in a form of "bitfile+metadata". This "leafy" organization of the archive allows for fast access to the electronic document during retrieval. The permanent storage location is a file system implementing the above tree physical organization. The File system is both layered to organize and access stored data and then uses a data storage device, such as a hard disk or CD-ROM to maintain the physical location of the data files. Data in the permanent storage location remains even if power is removed and cannot be written over. The temporary storage location is buffer space or storage locations in the file system that can have their contents written over.

The computing system environment where a server hosts the archiving transaction manager is only one example of a suitable computing environment and is not intended to suggest any limitation as to the scope of use or functionality of the invention. The transaction manager is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The transaction manager may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below. In general, the program modules may be implemented as software instructions, Logic blocks of electronic hardware, and a combination of both. The software portion may be stored on a machine-readable medium and written in any number of programming languages such as Java, C++, C, etc. Therefore, the component parts, such as the transaction manager, etc. may be fabricated exclusively of hardware logic, hardware logic interacting with software, or solely software.

A memory to store the transaction manager may include read only memory (ROM); a hard drive, a CD ROM, random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown, the invention is not to be limited to these embodiments. The invention is to be understood as not limited by the specific embodiments described herein, but only by scope of the appended claims.

What is claimed is:

1. An apparatus, comprising:
   a first instance of a server transaction manager application stored in a memory on an archival portal server in an archival unit, where the server transaction manager application is configured to 1) transactionally archive an electronic document between multiple interconnected archive units of a distributed server network in geographically-dispersed locations in order to store identical copies of the electronic document in two or more of the archive units at the same time, 2) monitor a persistent state of the archiving of the electronic document, and 3) reconcile the multiple interconnected archive units if an error occurs between a start of a transmission of the electronic document and a permanent archiving of that electronic document in any of the multiple interconnected archive units, where the archive units of the distributed server network are configured to allow uninterrupted access from a client machine to at least one of the copies of the archived electronic document even if one archive unit location is not accessible, where the first instance of the server transaction manager application is coded to send a two-phase commit protocol to a selected set of transaction manager instances resident on archive units remote from that archival portal server;

a permanent data storage location in each of the archive units configured to store the electronic document; and a temporary data storage location in each of the archive units configured to store the electronic document during the two-phase commit protocol, where when the selected set of transaction manager instances resident on the remote archive units validate that the electronic document is uncompromised and stored in the temporary storage location, then the first instance of the transaction manager application is configured to communicate to the selected set of transaction manager instances resident on the remote archive units to move the electronic document from the temporary storage location to the permanent storage location.

2. The apparatus of claim 1, wherein the multiple interconnected archive units of the distributed server network in the geographically-dispersed locations are configured to communicate with each other via a protocol network connection at a data link layer and execute one stream between pairs of instances of the transaction managers with commands and attached attachments, which include a metadata attachment and the data of the electronic document as the other attachment, during the archiving of the copies of the electronic document, and each transaction manager is configured to exchange messages of the two-phase commit protocol among themselves over the protocol network connection during the archiving of the copies of the electronic document.

3. The apparatus of claim 1, wherein the instances of transaction manager are configured to work together to ensure that an integrity of the multiple interconnected archive units is reconciled and that an exact copy of an electronic document is permanently archived at two or more archival units in geographically-dispersed locations in the multiple interconnected archive units.

4. The apparatus of claim 1, wherein the transaction manager application is configured to implement 1) a commit method of the two-phase commit protocol to write the electronic document in permanent storage at the end of the archival transaction process and 2) a rollback method to rollback the archive units to remove reference to the electronic document in the index unit, and communicate when an error occurred in the archival transaction process in order to restore consistency among the geographically dispersed archival units.

5. The apparatus of claim 1, wherein the first instance of the transaction manager application on the archival portal server is configured to execute the two-phase commit protocol with the selected set of transaction manager instances resident on the two or more archive units when a new electronic document comes in from the client machine for archiving, and where the client machine is a customer's Simple Mail Transfer Protocol (SMTP) server, and the two-phase commit protocol has five steps.

6. The apparatus of claim 5, wherein the first instance of the transaction manager application is configured to receive a message setup exchange between the customer's SMTP server and the archival portal server, and the electronic document to be archived is transferred from the customer's SMTP server to the archive portal server as an email, and the archival portal server sends the electronic document to the selected set of two or more transaction manager instances via the two-phase commit protocol for storage as a bitfile, and executes methods of the two-phase commit protocol in parallel on with the transaction manager instances resident on the two or more archival units.

7. The apparatus of claim 1, wherein each instance of the transactional manager resident on its archival portal server is configured to upon receiving each new electronic document to cooperate with the selected set of two or more transaction manager instances each resident on its own archive unit to implement the following five methods of the two-phase commit protocol consisting of: a begin method, an archive method, a prepare method, a commit method, and a rollback method.

8. The apparatus of claim 7, wherein the begin method of the two-phase commit protocol is configured in the transaction manager instances to initiate the archiving transaction of the new electronic document and assign a globally-unique transaction ID to the new archiving transaction.

9. The apparatus of claim 7, wherein the archive method is configured to be a command that carries attachments including a first and second attachments, where the first attachment represents a bitfile containing a compressed copy of the original electronic document, and the second attachment is a compressed copy of the additional metadata associated with the new electronic document, and with an invocation of the archive method, the new electronic document attachment and its meta-data attachment are written into in the temporary data storage location, and then an integrity check of the transferred attachments is applied.

10. The apparatus of claim 7, wherein the prepare method is configured in the transaction manager instances to prepare the archiving transaction of the new electronic document for the final commit method on the selected set of two or more archival units by mapping a propagation of the new electronic document that has passed its integrity check from the temporary data storage location into the permanent data storage location, change a status of the archiving transaction to prepared, and initiate a communication from the selected set of transaction managers on the remote archival units that the prepare method was successful on each of the remote archival units for the archiving transaction, and it is okay to proceed to the commit method of the two-phase commit protocol.

11. The apparatus of claim 10, wherein the commit method is configured to move the electronic document including its metadata on the selected set of two or more remote archive units to their permanent memory data storage location, and delete the archiving transaction from the list of transactions in progress, and once the committed method is executed an archival transaction of the electronic document cannot be rolled back, and the permanent data storage location is a file system where the data 1) remains stored even if the power is lost and 2) the data cannot be over written.

12. The apparatus of claim 7, wherein the archival transaction of the electronic document is configured in the transaction manager instances to be capable of being rolled back at any pointing in the two-phase commit protocol prior to execution of the commit method, and the rollback method removes the streamed electronic document including its metadata from the remote archive unit's temporary data storage location and memory map.

13. The apparatus of claim 1, wherein the first instance of the transactional manager resident on the archival portal server is coded to implement the following two phase commit protocol for a newly received electronic document and the distributed archival transaction across the selected set of remote archival units occurs in parallel, and the two-phase commit protocol starts with a begin method to create a new, globally unique document ID and transaction ID for the electronic document, then the transaction manager resident on the archiving portal invokes an archive method to archive electronic documents and associated meta-data on the selected set of two or more remote archival units, and implementation of the archive method on the archiving portal server will invoke a remote archive method on each of the selected set of two or more archival units in parallel.

14. The apparatus of claim 1, wherein the first instance of the transaction manager resident on the archival portal server is configured to use the two-phase commit protocol to attach an arbitrary amount of data to the selected set of remote archival units by streaming a command with attachments during the archiving process from the transaction manager resident on the archival portal server to the selected set of other instances of transaction managers on the remote archival servers.

15. The apparatus of claim 1, wherein each instance of the transaction manager application resident on a remote archival unit is configured to listen at a non-blocking socket of its server and probe an object in a streaming session for the presence of an attachment, and if so, monitor for when a frame in the stream is not full of data or has a zero length, and that indicates that the transmission of the attachment to the command is complete.

16. The apparatus of claim 15, wherein each instance of the transaction manager application is further configured for the non-blocking socket to not close when the transaction is complete, instead the socket is kept open and thus the non-blocking socket does not need to cycle thru closing and reopening for the next method in the two-phase commit protocol or for the command with a second attachment, where the server transaction manager application listening at the non-blocking socket merely recognizes when a transmission of an attachment is complete when a last frame in the sequence is 1) not full with data or 2) has a zero length.

17. A method, comprising:
archiving of an electronic document between multiple interconnected archive units of a distributed server network in geographically-dispersed locations in order to store identical copies of the electronic document at the same time in two or more of the archive units;
causing an archival portal server in the distributed server network to send a five-step, two-phase commit protocol to a selected set of transaction manager instances resident on the two or more archive units, where each transaction manager instance is resident on its own archive unit;
monitoring a persistent state of the archiving of the electronic document;
assigning a unique ID to each electronic document in a temporary data storage location in each archive unit in the selected set based on receiving a begin method of the two-phase commit protocol from a transaction manager resident on the archival portal server and storing the electronic document in the temporary data storage location during the two-phase commit protocol;
reconciling the multiple interconnected archive units if an error occurs between a start of a transmission of the electronic document and a permanent data storage location of that electronic document;
storing the electronic document in the permanent data storage location of each of the selected set of two or more archive units at an end of the two-phase commit protocol; and
allowing uninterrupted access from a client machine to at least one of the copies of the archived electronic document in the archive units of the distributed server network even when one of the archive units is not accessible.

18. The method of claim 17, further comprising:
implement the following five-step, two-phase commit protocol for a newly received electronic document, wherein a transactional manager application resident on the archival portal server receiving the new electronic document cooperates with other instances of the transactional manager on the selected set of two or more archive units to implement the following five methods of the two-phase commit protocol consisting of: a begin method, an archive method, a prepare method, a commit method, and a rollback method;
initiating the archiving transaction of the newly received electronic document on the set of two or archive units at the same time;
assigning a globally-unique transaction ID to the archiving transaction with the begin method of the two-phase commit protocol; and
transmitting a command that carries attachments including a first and a second attachments with the archive method, wherein the first attachment represents a "bitfile" containing a compressed copy of an original electronic document, and the second attachment is a compressed copy of the additional metadata associated with the electronic document.

19. The method of claim 18, further comprising:
preparing archiving transaction of the electronic document for the final commit method on the set of two or more archival units with the prepare method by mapping a propagation of the electronic document that has passed its integrity check from a temporary data storage location in the archive unit into a permanent data storage location in the archive unit, changing a status of the archiving transaction to prepared, and receiving a communication from the set of two or more archival units that the prepare method was successful on each of the archival units for the archiving transaction to proceed to the commit method of the two-phase commit protocol.

20. The method of claim 19, further comprising:
moving the electronic document including its metadata on the set of two or archive units to their permanent data storage location each of the archive units by invoking a remote commit method with a transaction manager on the archival portal server, and deleting the archiving transaction from the list of transactions in progress with the commit method.

* * * * *